United States Patent [19]
Oda et al.

[11] Patent Number: 5,737,245
[45] Date of Patent: Apr. 7, 1998

[54] DISTANCE MEASUREMENT DEVICE

[75] Inventors: Hajime Oda; Takuma Takahashi, both of Yotsukaido, Japan

[73] Assignee: Seiko Precision Inc., Japan

[21] Appl. No.: 525,351

[22] Filed: Sep. 7, 1995

[30] Foreign Application Priority Data

Sep. 7, 1994 [JP] Japan .................. 6-213884

[51] Int. Cl.$^6$ .................................... G01C 3/00
[52] U.S. Cl. .................................. 364/561; 364/562
[58] Field of Search .............................. 364/561, 562, 364/474.28, 413.07, 557; 324/644, 662, 635, 716; 356/3, 4.01, 5.01, 5.03; 33/700, 701, 713–717; 342/47, 118, 458; 367/99, 118, 121, 127, 128

[56] References Cited

U.S. PATENT DOCUMENTS

| | | | |
|---|---|---|---|
| 4,309,098 | 1/1982 | Shenk | 354/195 |
| 4,367,027 | 1/1983 | Stauffer | 354/195 |
| 4,761,526 | 8/1988 | Muramoto | 364/557 X |
| 5,107,449 | 4/1992 | Ikuta | 364/561 |
| 5,410,474 | 4/1995 | Fox | 364/413.07 |

Primary Examiner—Emanuel T. Voeltz
Assistant Examiner—M. Kemper
Attorney, Agent, or Firm—Adams & Wilks

[57] ABSTRACT

A distance measurement device includes a distance measurement device for measuring a distance to an object, a processor for determining which respective measurement zone a measurement result of the distance measurement device is in, from a plurality of measurement zones within a range of distance measurement of the distance measurement device; and a plurality of output terminals for outputting, based on the determination by the processor, a predetermined output signal corresponding to the respective measurement zones. The output terminals output a signal which is not representative of any respective measurement zone for a predetermined period of time at the time of the end of a distance measurement operation.

13 Claims, 5 Drawing Sheets

FIG.4

| No. | Output | Measurement area | | |
|---|---|---|---|---|
| | | Z1 | Z2 | Z3 |
| 1 | Da | H | L | H |
| | Db | H | H | L |
| 2 | Da | H | L | H |
| | Db | H | L | L |
| 3 | Da | H | H | L |
| | Db | H | L | L |
| 4 | Da | H | L | L |
| | Db | L | H | L |
| 5 | Da | H | H | L |
| | Db | L | H | L |
| 6 | Da | H | H | L |
| | Db | L | H | H |
| 7 | Da | H | L | L |
| | Db | L | L | H |

5,737,245

DISTANCE MEASUREMENT DEVICE

FIELD OF THE INVENTION

The present invention relates generally to a distance measurement device which measures the distance to an object. More specifically, the present invention relates to a distance measurement device which divides its full distance measurement range into a plurality of measurement zones and which determines the measurement zone of a distance measurement performed by the device, and to a method for outputting the result of the determination.

BACKGROUND INFORMATION

Applicants have proposed a distance measurement device that performs distance measurement by determining which measurement zone the result of a distance measurement corresponds to. In such a distance measurement device, the device divides its full measurable range into a plurality of distance ranges, or measurement zones, and outputs the result of judgment in accordance with the particular measurement zone the measurement corresponds to. As a form of that output, it is possible to use a method in which a plurality of output terminals are provided, each corresponding to a respective one of the plurality of measurement zones. In accordance with this method, an output signal is provided on the terminal corresponding to a particular measurement zone. In accordance with another possible method, a lesser number of output terminals are provided and a result of a measurement zone judgment is output using a combination of output levels corresponding to various distance ranges. Also, when there is a need to operate a distance measurement device continuously and to detect the output state in sequence, an additional output terminal is required to indicate the termination of individual measurement operations in order to update the output.

FIG. 5 is a block diagram showing a proposed distance measurement device. As illustrated, the distance measurement device includes a distance measurement means 51 for measuring the distance to an object T using known means, such as an infrared or ultrasonic output signal. The output signal of the distance measurement means 51 is supplied to a judgment means 52 which determines a respective measurement zone from a plurality of measurement zones which make up the full range of detection of the distance measurement device. When the distance measurement device divides a measurable range into three measurement zones, output means 53 requires a measurement end terminal TSE in addition to output terminals TDa, TDb, and TDc each providing an output signal indicating that an object is in the corresponding measurement zone. Therefore, four output terminals from the output means 53 are required.

In the proposed distance measurement device shown in FIG. 5, since the measurement end terminal TSE is required, the number of lead terminals of a circuit element (for example, a control microprocessor) or the number of pins of a connector connecting signal lines is increased and therefore the cost of parts or assembly is also increased. In addition, where there is the need to send the above-described signal a long distance, an increase in the number of signal lines is accompanied by an increase in the cost of production and a reduction in reliability.

SUMMARY OF THE INVENTION

An objective of the present invention is therefore to provide a distance measurement device which is low in cost and has an improved output format and enhanced reliability.

In order to meet the above-described and other objects, the distance measurement device of the present invention comprises distance measurement means for measuring a distance to an object, judgment means for judging which measurement zone the measurement of the distance measurement means belongs to, from a plurality of measurement zones divided within a full range of distance measurement of the distance measurement means, and output means including a plurality of output terminals for outputting, in accordance with a judgment of the judgment means, a predetermined unique combination of output levels corresponding to the respective measurement zones. The output terminals also output a predetermined unique combination of output levels other than the combination of output levels representative of the measurement zones for a predetermined period of time at the time of the end of a distance measurement of the distance measurement operation means.

Also, only when the distance measurement result belongs to a long distance or short distance end area, at least one of the plurality of output terminals outputs a level different from that when the distance measurement result belongs to other measurement zones, and when the distance measurement result does not belong to a long distance or short distance end area, at least one of the plurality of output terminals outputs a level different from that when the distance measurement result belongs to other measurement zones.

BRIEF DESCRIPTION OF THE DRAWINGS

FIG. 4 is a diagram showing a combination of output levels of the distance measurement device of the present invention.

DETAILED DESCRIPTION OF THE INVENTION

The present invention will hereinafter be described in detail in accordance with one embodiment thereof shown in the accompanying drawings.

Figure 1:
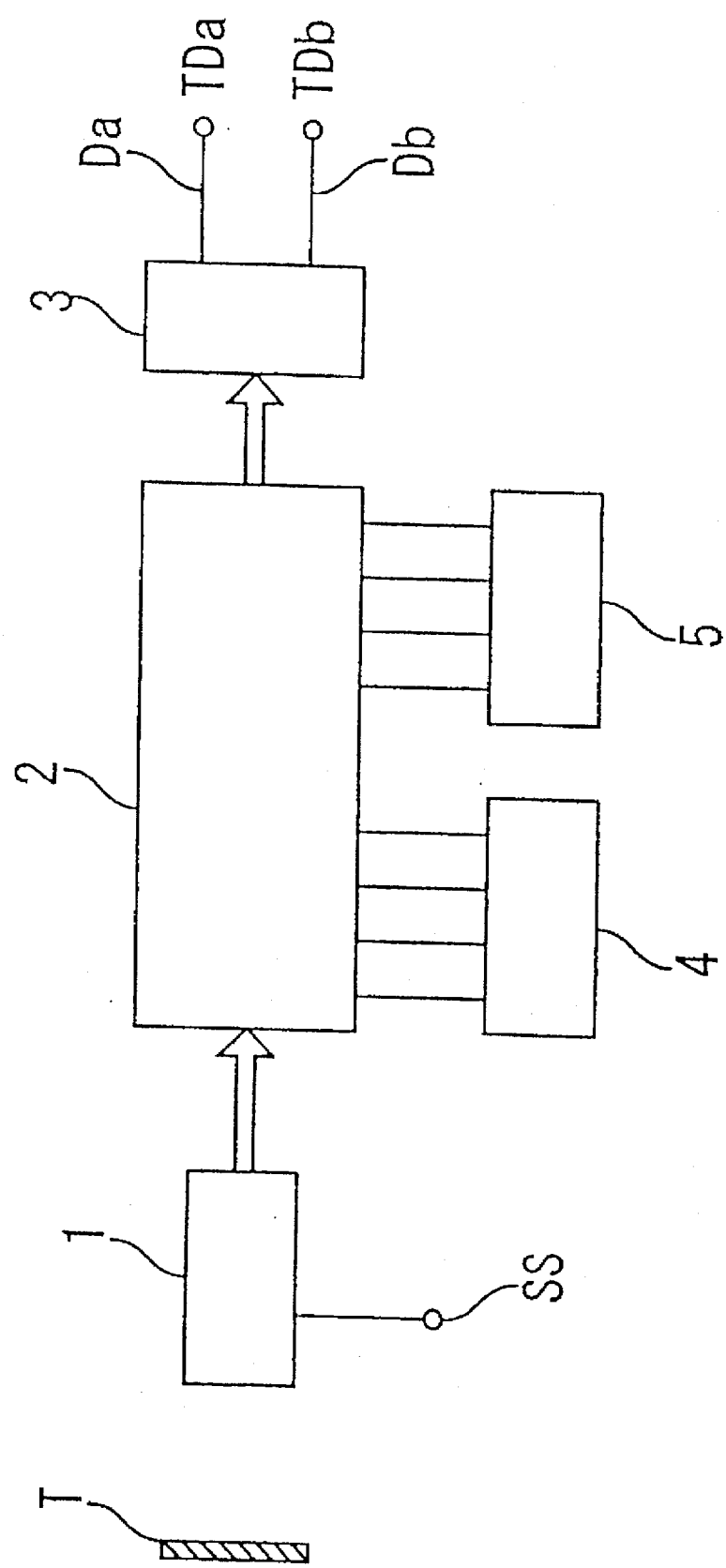
FIG. 1 is a circuit block diagram of one embodiment of a distance measurement device according to the present invention.

FIG. 1 is a circuit block diagram showing the construction of a preferred embodiment of the distance measurement device of the present invention. For simplicity, a description is made of a case where the measurable range of the distance measurement means i is divided into three measurement zones using two specific distance division points (hereinafter referred to as division points).

In FIG. 1, reference numeral 1 denotes distance measurement means for measuring a distance to an object T and converting the result into a digital output signal. The distance measurement means i may comprise, for example, means for emitting infrared light and detecting light reflected from the object T with a position sensitive device (hereinafter referred to as PSD), or means for measuring a distance using ultrasonic waves. Reference numeral 4 denotes first setting means for setting a first division point Pa, and reference numeral 5 denotes second setting means for setting a second division point Pb. In FIG. 1, there is shown a case where each of the setting means 4 and 5 comprises a digital switch having a four-bit output. In this case, with combinations of voltage levels of four bits, each of the division points Pa and Pb can be set to 16 different values. Thus, the full range of distance measurement of the distance measurement means is broken down into one of 32 possible sub-ranges by the first and second setting means 4,5.

Figure 2:
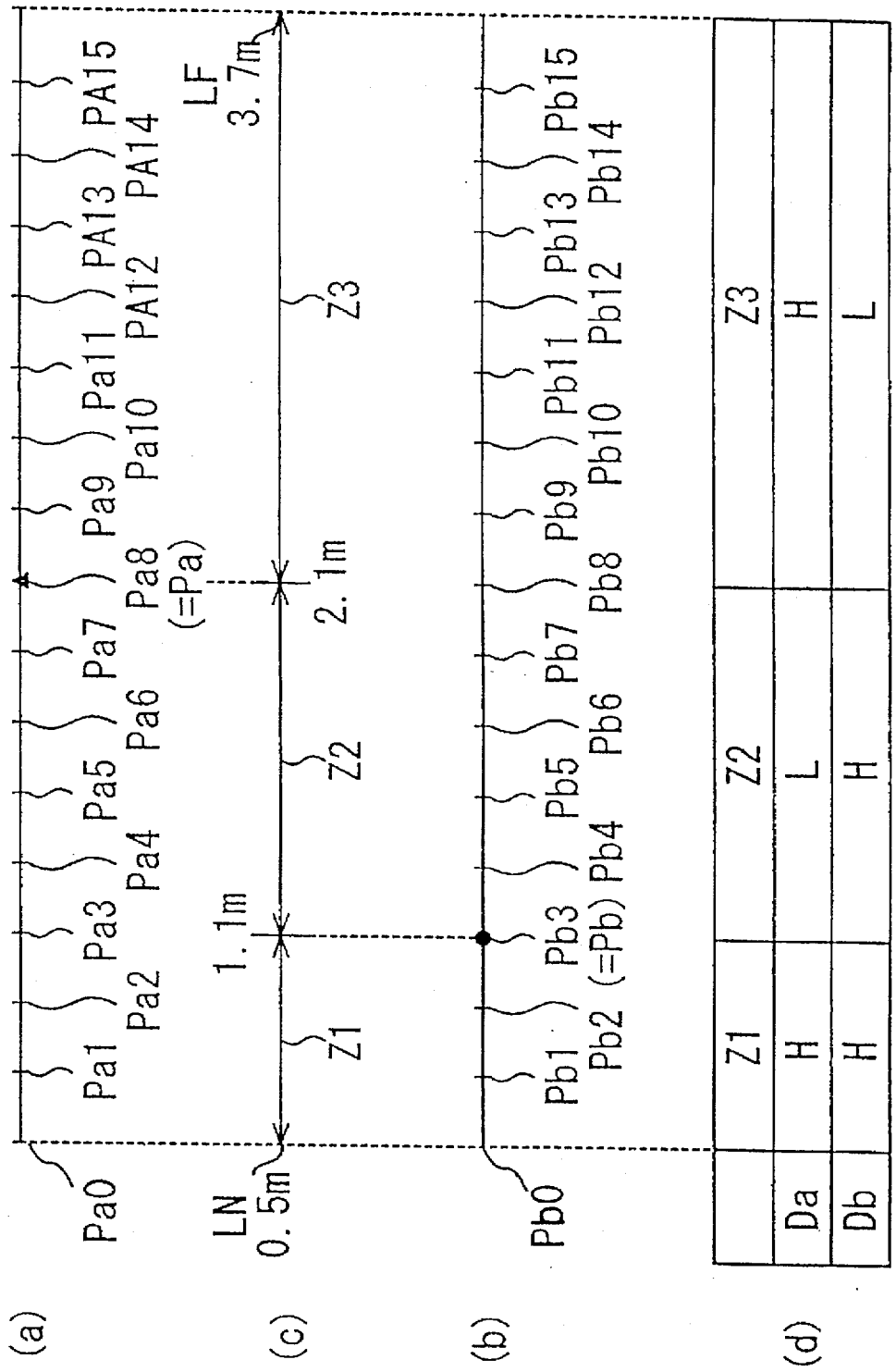
FIG. 2 is a diagram used to explain the distance area of the distance measurement device of the present invention.

This relationship will be described with reference to FIG. 2. In FIG. 2, the abscissa represents a distance from the distance measurement means 1. The longest distance point is represented by LF (for example, 3.7 m), and the shortest distance point is represented by LN (for example, 0.5 m). Now, the case where the full measurement range (LNF) is divided into 16 equal sub-ranges using the 16 different digital output settings by the first setting means 4, is considered. The first division point Pa can be set to any of distance points Pan where n is a natural number between 0 and 15, as shown in FIG. 2(a). In FIG. 2(a), there is shown a case where the division point Pa has been set to Pa8 (n=8), and the distance from the distance measurement means 1 becomes 2.1 m (0.5+8×0.2 m).

Likewise, the second division point Pb can be set to any of distance points Pbm where m is a natural number between 0 and 15, as shown in FIG. 2(b). In FIG. 2(b), there is shown a case where the second division point Pb has been set to Pb3 (m=3), and a distance from the distance measurement means 1 becomes 1.1 m (0.5 m+3×0.2 m). That is, the first division point Pa is set to 2.1 m by the setting means 4, and the second division point Pb is set to 1.1 m by the second setting means 5.

Returning to FIG. 1, reference numeral 2 denotes judgment means, such as a microcontroller or microprocessor, for determining which measurement zone the measurement result of the distance measurement means 1 belongs to, from three measurement zones Z1, Z2, and Z3 (see FIG. 2(c)) which are divided at the first division point Pa and the second division point Pb. The judgment means 2 outputs the result of the judgment to output means 3. The output means 3 outputs to two output terminals TDa and TDb which have outputs Da and Db at the levels shown in FIG. 2(d), based on the result of the judgment means 2. That is, the levels of the outputs of the measurement zone Z1 on the short distance side that is divided with the division point Pa are Da="H" and Db="H". The levels of the outputs of the central measurement zone Z2 that is divided with the division points Pa and Pb are Da="L" and Db="H". The levels of the outputs of the measurement zone Z3 on the long distance side that is divided with the division point Pb are Da="H" and Db="L". Here, "H" represents a high voltage, i.e., a high level, and "L" represents a low voltage, i.e., a low level.

In order to identify the three measurement zones Z1, Z2, and Z3 with a combination of "H" and "L" levels of two outputs Da and Db, seven combinations of output levels are possible, as shown in FIG. 4. Da and Db are named for convenience, and in order of Z1, Z2, and Z3, a combination of Da="H", "L", "H" and Db="H", "H", "L" and a combination of Db="H", "L", "H" and Da="H", "H", "L" are considered to be the same.

If, in this combination, the level of the distance measurement device in an inoperative or standby state (hereinafter referred to as a normal state) is assumed to be Da="L" and Db="L", Nos. 2, 3, 4, 5, and 7 of FIG. 4 can easily be misinterpreted because they include this combination. Also, in Nos. 3, 6 and 7 of FIG. 4, the outputs Da and Db both include a combination where two adjacent areas are the same level, so an intermediate area such as the measurement zone Z2 cannot be represented with only one output line. The present invention, therefore, provides for every possible case without requiring additional output terminals by using the output combination of No. 1. In the combination No. 1, the level of the output Db is the same "H" level at both distance areas Z1 and Z2 and goes to "L" when Z2 changes to Z3, and the level of the output Da goes at the central distance area Z2 to "L" which is different from the level "H" of the two adjoining distance areas Z1 and Z3.

Thus, where two output signal lines are used, a level different from the level of the above-described normal state will be obtained if the outputs Da and Db of the distance measurement result are both used. Also, where only one output line can be used for some reasons but the end of the distance measurement can be determined by other methods, the output Db can be used in applications where it is adequate to determine if an object is in either of measurement zones Z1 and Z2, closer to the division point Pa, or in measurement zone Z3 away from the division point Pa, and the output Da can be used in applications where it is necessary to determine whether an object is in the intermediate measurement zone Z2.

Figure 3:
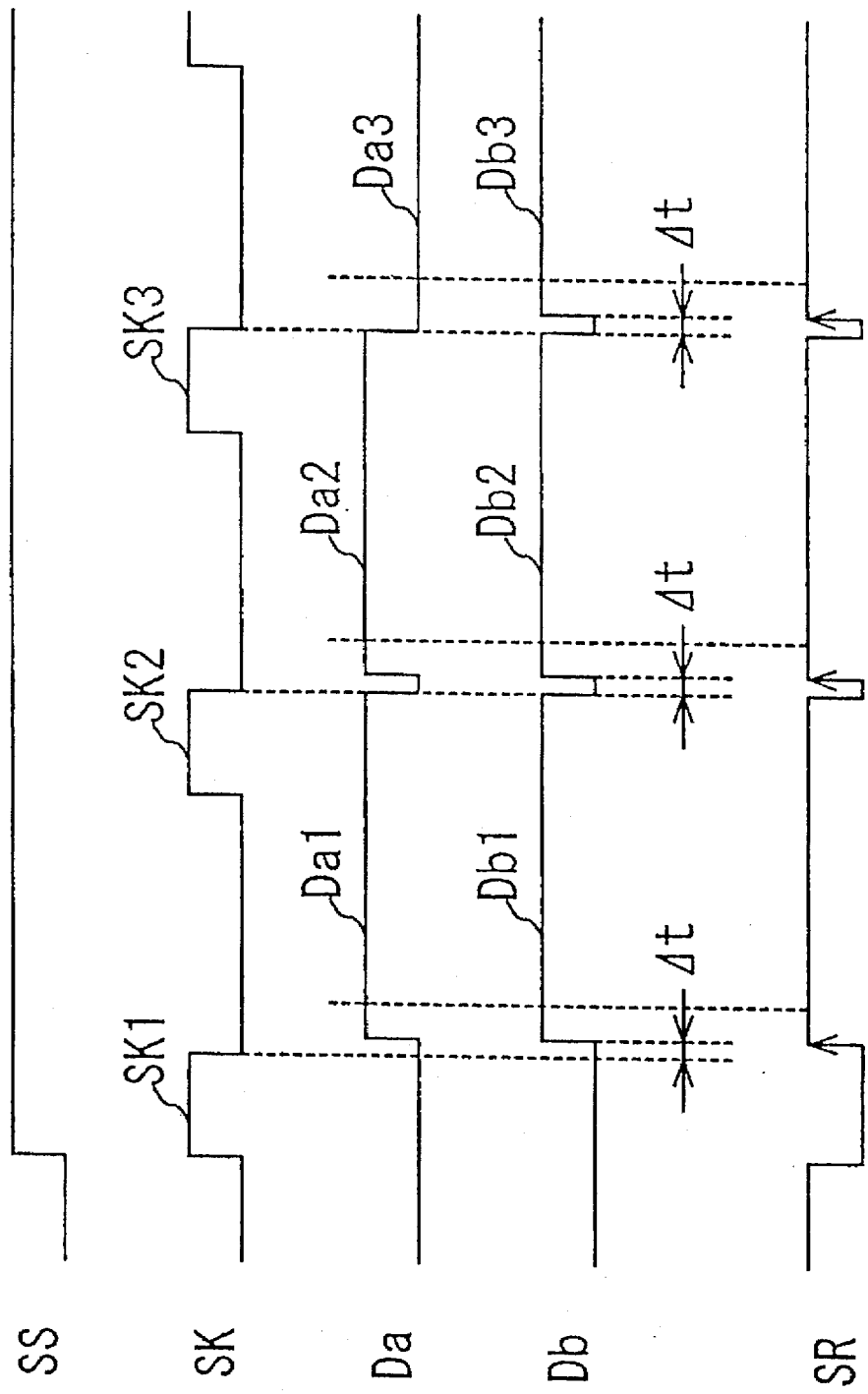
FIG. 3 is a timing diagram showing the operation of the distance measurement device of the present invention.
Figure 5:
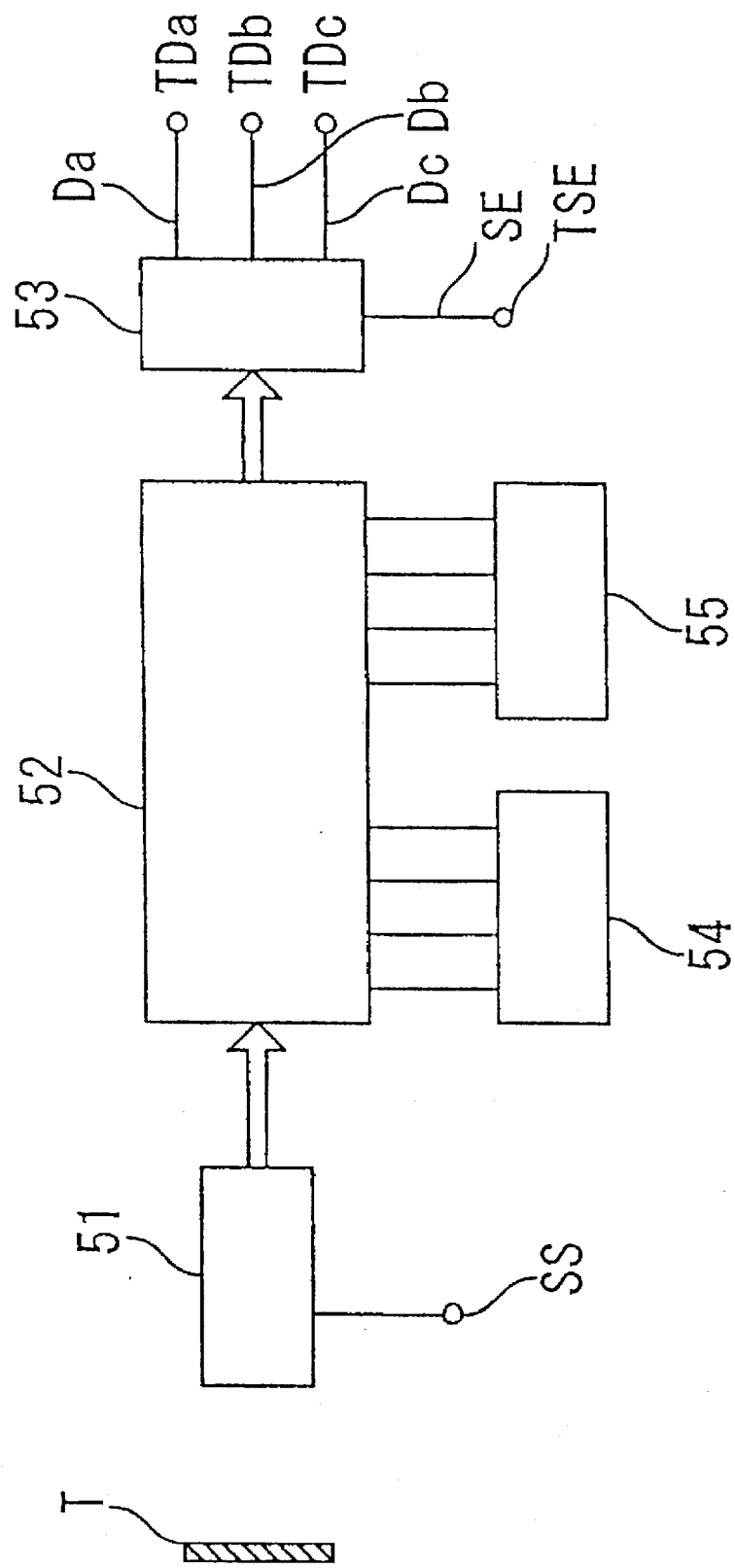
FIG. 5 is a circuit block diagram showing applicant's previously proposed distance measurement device.

FIG. 3 is a timing diagram showing the operation of the distance measurement device of the present invention. In FIG. 3, when a start signal SS for starting a distance measurement operation is generated, the distance measurement means 1 will repeat the distance measurement operation SK (SK1, SK2, SK3, ...) at predetermined intervals of time. In FIG. 3, the measurement result of the first and second distance measurements SK1 and SK2 are in measurement zone Z1 and the third distance measurement SK3 is in measurement zone Z2. That is, the outputs Da1 and Db1 of the first measurement are both "H" levels until the next measurement operation is ended and the outputs Da2 and Db2 of the second measurement are also "H" levels, but the output Da3 of the third measurement has gone to an "L" level.

In order to update the outputs after the distance measurement operation SK is performed in accordance with the present invention, the outputs Da and Db are set to measured levels after they are first forcibly set to "L" levels for a time period of Δt, as shown in FIG. 3. Since the start signal SS is on during the distance measurement, it is easily determined that the distance measurement device is not in the above-described normal state even when the outputs Da and Db are both at "L" levels. In this case, the end of the distance measurement operation can be detected by monitoring the levels of the outputs Da and Db. For example, if a circuit outputting a signal such as SR shown in FIG. 3 (which signal is normally at a "H" level but which is at an "L" level only when Da="L" and Db="L") is provided to an external control circuit and the signals of Da and Db are read a predetermined time after the output SR goes to a "H" level, the states of the outputs can be read with reliability.

It is also possible to connect the output Da or Db to the base of a transistor through resistors and drive a relay connected to the collector as a load. In such a case, however, it is important that the above-described period Δt has been set to a sufficiently short duration so that the "L" level during that period does not have an adverse influence on the state of the relay.

Since a distance measurement device such as this is usually started up with a signal such as an external start signal SS, the above-described normal state and the state of measurement can be distinguished by external devices, and a level to be given to the output Da or Db to judge the update of the output may therefore be the same as that during the normal state.

According to the present invention, the distance measurement device outputs a signal indicating the respective measurement zone an object is in, from a plurality of measurement zones. A predetermined level other than an output level representative of the respective measurement zone is output after the end of a measurement operation, so that an additional measurement operation end output terminal, which outputs a signal representative of the end of a distance measurement, becomes unnecessary. As a result, the number of lead terminals of a circuit element (for example, a control microprocessor) or the number of pins of a connector is reduced, and the cost of parts and assembly of the device is reduced. Also, where the above-described output signal must be sent a long distance, the number of required signal lines is fewer, so that the cost of production is reduced and reliability is enhanced. Accordingly, there is provided a distance measurement device which is low in cost and high in reliability.

We claim:

1. A distance measurement device comprising:
distance measurement means for measuring a distance to an object; setting means for dividing a measurement range of the distance measurement means into a plurality of measurement zones; judging means for judging which respective measurement zone the object is in; and output means for outputting a signal in accordance with an output of the judging means representative of the respective measurement zone and for outputting another signal not representative of a respective measurement zone for a predetermined time period at a predetermined time other than during a distance measurement operation of the distance measurement means to identify the end of a measurement operation; wherein the output means includes a plurality of output terminals for outputting a predetermined unique combination of output levels for each of the respective measurement zones and another predetermined unique combination of output levels other than that corresponding to the respective measurement zones to identify the end of a measurement operation.

2. A distance measurement device according to claim 1; wherein the distance measurement means comprises means for projecting an infrared light onto the object and a position sensitive device for detecting infrared light reflected by the object.

3. A distance measurement device according to claim 1; wherein the setting means comprises first setting means for dividing the measurement range of the distance measurement means into a plurality of first measurement zones by using at least one of a plurality of first division points which divide the measurement range by first intervals, and second setting means for dividing at least one of the plurality of first measurement zones into a plurality of second measurement zones by using at least one of a plurality of second division points which divide one of the divided first measurement zones by second intervals.

4. A distance measurement device according to claim 3; wherein the first and second setting means each comprise a digital switch.

5. A distance measurement device according to claim 1; wherein the output means includes means for generating a signal having a first level on at least one of the output terminals when the measurement result of the distance measurement means corresponds to one of a furthest or nearest measurement zone among the plurality of measurement zones, and for generating another signal having a second level different from the first level on the at least one output terminal when the measurement result of the distance measurement means does not correspond to either of the furthest or nearest measurement zones, and means for generating a signal having the second level on at least one of the other output terminals when the measurement result of the distance measurement means corresponds to one of the furthest or nearest measurement zones and for generating another signal having the first level on the at least one other output terminal when the measurement result of the distance measurement means does not correspond to either of the furthest or nearest measurement zones.

6. A distance measurement device comprising:
distance measurement means for measuring a distance to an object; setting means for dividing a measurement range of the distance measurement means into a plurality of measurement zones; judging means for judging in which of the plurality of measurement zones the object is located in accordance with a measurement result of the distance measurement means; and output means including a plurality of output terminals for selectively generating one of a plurality of predetermined combinations of output signal levels on the output terminals representative of the respective measurement zone in accordance with a judged result of the judging means and for generating a predetermined combination of output signal levels on the output terminals, other than a combinations that is representative of any of the respective measurement zones, for a predetermined time period at a predetermined time other than during a distance measurement operation of the distance measurement means to identify the end of a measurement operation.

7. A distance measurement device according to claim 6; wherein the setting means comprises a first digital switch for dividing the measurement range of the distance measurement means into a plurality of first measurement zones by using at least one of a plurality of first division points which divide the effective measurement range by first intervals, and a second digital switch for dividing at least one of the plurality of first measurement zones into a plurality of second measurement zones by using at least one of a plurality of second division points which divide one of the divided first measurement zones by second intervals.

8. A distance measurement device, comprising:
distance measurement means for measuring a distance to an object; setting means for dividing a measurement range of the distance measurement means into a plurality of adjacent measurement zones; judging means for judging in which of the plurality of measurement zones the object is located in accordance with a measurement result of the distance measurement means; and output means for generating a first output signal representative of the measurement zone in which the object is located and a second output signal to identify the end of a measurement operation; wherein the first and second output signals are output on the same plurality of output terminals.

9. A distance measurement device according to claim 8; wherein the output means includes means for outputting on the plurality of output terminals a predetermined unique combination of output levels for each of the respective measurement zones and another predetermined unique combination of output levels other than that corresponding to any of the respective measurement zones to identify the end of a measurement operation.

10. A distance measurement device according to claim 8; wherein the output means includes means for generating a signal having a first level on at least one of the output terminals when the measurement result of the distance measurement means corresponds to one of a furthest or nearest measurement zone among the plurality of measurement zones, and for generating another signal having a second level different from the first level on the at least one output terminal when the measurement result of the distance measurement means does not correspond to either of the furthest or nearest measurement zones, and means for generating a signal having the second level on at least one of the other output terminals when the measurement result of the distance measurement means corresponds to one of the furthest or nearest measurement zones and for generating another signal having the first level on the at least one other output terminal when the measurement result of the distance measurement means does not correspond to either of the furthest or nearest measurement zones.

11. A distance measurement device according to claim 8; wherein the distance measurement means comprises means for projecting an infrared light onto the object and a position sensitive device for detecting infrared light reflected by the object.

12. A distance measurement device according to claim 8; wherein the setting means comprises first setting means for dividing the measurement range of the distance measurement means into a plurality of first measurement zones by using at least one of a plurality of first division points which divide the effective measurement range by first intervals, and second setting means for dividing at least one of the plurality of first measurement zones into a plurality of second measurement zones by using at least one of a plurality of second division points which divide one of the divided first measurement zones by second intervals.

13. A distance measurement device according to claim 12; wherein the first and second setting means each comprise a digital switch.

* * * * *